(12) United States Patent
Ben-Haim et al.

(10) Patent No.: US 10,252,151 B2
(45) Date of Patent: Apr. 9, 2019

(54) GYROSCOPIC APPARATUSES AND METHODS OF USING SAME

(71) Applicant: Motorika Limited, Hamilton (BM)

(72) Inventors: Shlomo Ben-Haim, London (GB); David Prutchi, Voorhees, NJ (US)

(73) Assignee: Motorika Limited, Hamilton (BM)

( * ) Notice: Subject to any disclaimer, the term of this patent is extended or adjusted under 35 U.S.C. 154(b) by 134 days.

(21) Appl. No.: 14/385,193

(22) PCT Filed: Mar. 14, 2013

(86) PCT No.: PCT/IB2013/052013
§ 371 (c)(1),
(2) Date: Sep. 15, 2014

(87) PCT Pub. No.: WO2013/136287
PCT Pub. Date: Sep. 19, 2013

(65) Prior Publication Data
US 2015/0031510 A1    Jan. 29, 2015

Related U.S. Application Data

(60) Provisional application No. 61/611,133, filed on Mar. 15, 2012.

(51) Int. Cl.
*A61H 1/02*        (2006.01)
*H02M 1/34*        (2007.01)
(Continued)

(52) U.S. Cl.
CPC .......... *A63F 13/211* (2014.09); *A61H 1/0274* (2013.01); *A63B 21/00178* (2013.01); *A63B 21/00181* (2013.01); *A63B 21/22* (2013.01); *A63B 21/222* (2015.10); *A63B 23/03508* (2013.01); *A63B 23/1209* (2013.01); *A63B 24/0062* (2013.01); *A63B 24/0087* (2013.01); *A63F 13/235* (2014.09); *A63F 13/92* (2014.09); *H02M 1/34* (2013.01); *H02M 5/297* (2013.01);
(Continued)

(58) Field of Classification Search
CPC ......... H02M 5/297; H02M 1/34; A63B 21/22; A63B 21/222
See application file for complete search history.

(56) References Cited

U.S. PATENT DOCUMENTS 4,684,124 A   8/1987   Escher
5,058,571 A   10/1991  Hall
(Continued)

FOREIGN PATENT DOCUMENTS

WO    WO 2013/136287    9/2013

OTHER PUBLICATIONS

International Preliminary Report on Patentability Dated Sep. 25, 2014 From the International Bureau of WIPO Re. Application No. PCT/IB2013/052013.
(Continued)

*Primary Examiner* — Sundhara M Ganesan

(57) ABSTRACT

A gyroscopic exercise apparatus, comprising: at least one control-moment gyroscope; at least one motion sensor for sensing movement of the apparatus; at least one spindle motor for providing rotation to a rotor of the gyroscope; and, at least one reversible motor for providing rotation to at least one gimbal of the gyroscope.

21 Claims, 16 Drawing Sheets

(51) Int. Cl.
| | |
|---|---|
| A63B 21/00 | (2006.01) |
| A63B 21/22 | (2006.01) |
| A63B 23/04 | (2006.01) |
| A63B 23/12 | (2006.01) |
| A63B 24/00 | (2006.01) |
| A63B 71/00 | (2006.01) |
| A63B 71/06 | (2006.01) |
| A63F 13/92 | (2014.01) |
| H02M 5/297 | (2006.01) |
| A63B 21/072 | (2006.01) |
| A63F 13/837 | (2014.01) |
| A63F 13/816 | (2014.01) |
| A63F 13/235 | (2014.01) |
| A63F 13/211 | (2014.01) |
| A63B 23/035 | (2006.01) |
| A63B 23/025 | (2006.01) |

(52) U.S. Cl.
CPC .......... A61H 1/0237 (2013.01); A61H 1/0296 (2013.01); A61H 2201/1215 (2013.01); A61H 2201/164 (2013.01); A61H 2201/1604 (2013.01); A61H 2201/165 (2013.01); A61H 2201/1635 (2013.01); A61H 2201/1659 (2013.01); A61H 2201/5007 (2013.01); A61H 2201/5012 (2013.01); A61H 2201/5084 (2013.01); A61H 2201/5092 (2013.01); A61H 2201/5097 (2013.01); A63B 21/0726 (2013.01); A63B 21/4001 (2015.10); A63B 23/025 (2013.01); A63B 23/04 (2013.01); A63B 2024/0068 (2013.01); A63B 2024/0093 (2013.01); A63B 2024/0096 (2013.01); A63B 2071/0072 (2013.01); A63B 2071/0655 (2013.01); A63B 2209/10 (2013.01); A63B 2220/13 (2013.01); A63B 2220/30 (2013.01); A63B 2220/40 (2013.01); A63B 2220/803 (2013.01); A63B 2220/806 (2013.01); A63B 2225/20 (2013.01); A63B 2225/50 (2013.01); A63F 13/816 (2014.09); A63F 13/837 (2014.09); A63F 2300/105 (2013.01); A63F 2300/1012 (2013.01); A63F 2300/1037 (2013.01)

(56) References Cited

U.S. PATENT DOCUMENTS

| | | | |
|---|---|---|---|
| 6,039,290 | A | 3/2000 | Wie et al. |
| 6,458,089 | B1 | 10/2002 | Ziv-Av |
| 6,695,794 | B2 | 2/2004 | Kaiser et al. |
| 6,730,049 | B2 | 5/2004 | Kalvert |
| 2011/0244963 | A1 | 10/2011 | Grant et al. |
| 2013/0040783 | A1* | 2/2013 | Duda ................ G08B 21/0266 482/9 |
| 2013/0194085 | A1* | 8/2013 | Grant .................... G06F 3/016 340/407.2 |

OTHER PUBLICATIONS

International Search Report and the Written Opinion Dated Aug. 16, 2013 From the International Searching Authority Re. Application No. PCT/IB2013/052013.
Brown et al. "Energetics of Control Moment Gyroscopes as Joint Actuators", Journal of Guidance, Control, and Dynamics, 32(6): 1871-1883, Nov.-Dec. 2009.
Carpenter et al. "Reducing Base Reactions With Gyroscopic Actuation of Space-Robotic Systems", IEEE Transactions on Robotics, 25(6): 1262-1270, Dec. 2009.
ECP "Model 750 Control Moment Gyroscope", ECP, Educational Control Products, Fact Sheet, 2 P.
Jarc et al. "The Design and Control of a Low-Power, Upper-Limb Prothesis", Proceedings of the IEEE 32nd Annual Northeast Bioengineering Conference, Northeast Easton, PA, USA, Apr. 1-2, 2006, XP010915967, p. 165-166, Apr. 2006. Section I.
Yano et al. "Development of a Non-Grounded Haptic Interface Using the Gyro Effect", Proceeding of the 11th Symposium on Haptic Interfaces for Virtual Environment and Teleoperator Systems, HAPTICS'03, Los Angeles, CA, USA, Mar. 22-23, 2003, XP010637668, p. 32-39, Mar. 2003. Fig.3, Para [03.2], [0004]-[0006].

* cited by examiner

GYROSCOPIC APPARATUSES AND METHODS OF USING SAME

RELATED APPLICATIONS

This application is a National Phase of PCT Patent Application No. PCT/IB2013/052013 having International filing date of Mar. 14, 2013, which claims the benefit of priority under 35 USC § 119(e) of U.S. Provisional Patent Application No. 61/611,133 filed Mar. 15, 2012. The contents of the above applications are all incorporated by reference as if fully set forth herein in their entirety.

FIELD AND BACKGROUND OF THE INVENTION

The present invention, in some embodiments thereof, relates to exercise, rehabilitation and/or entertainment devices and, more particularly, but not exclusively, to an active, exercise, rehabilitation and/or entertainment device.

Intensive rehabilitation therapy has been shown to be beneficial for patients recovering from stroke or brain injury who have limited strength or movement in the upper extremities. In the acute phase, physiotherapists commonly move the patient's affected limbs, slowly leading towards the patient moving the limb by himself/herself, possibly with some prompting or assistance by the physiotherapist.

Lately, robotic platforms have been introduced to help in the rehabilitation process. These specialized robots perform many of the actions traditionally made by physiotherapists, but incorporate visual feedback meant to provide a challenge and engage the patient cognitively. These robots perform the four basic interventions that are part of virtually all therapy plans: passive, active assistive, active range of motion, and progressive resistance.

Physical therapy must continue once the patient returns home from a rehabilitation center. For this chronic phase, physical therapy that incorporates the Nintendo® Wii® gaming system (more commonly known as "Wii-hab") has shown improved results over traditional rehabilitation therapy, mostly because it takes away the boredom of regular cyclic exercises. Patients see Wii-hab like a game, but it has been shown to be an effective therapy to improve balance and range of motion.

However, one major drawback of physical therapy methods based on the Wii® and similar consoles (e.g. Microsoft's Xbox 360® Kinect® motion control system) is that they cannot cause or oppose movement by the body. As such, the exercise conducted by patients is limited to exerting forces against the weight of the patient's limbs plus the lightweight controller.

Moreover, these therapy methods typically utilize virtual environments, providing patients with visual feedback as they perform repetitive arm movements to improve motor functionality, but patients often struggle to process such information because of the lack of haptic feedback. Robotic systems, which are able to provide such feedback forces, are bulky, expensive, and not well suited for the home environment. A skilled therapist is thus required when using Wii-hab and similar rehabilitation systems to provide hand-over-hand guidance ("shaping") to assist the affected arm in performing functional tasks.

U.S. Pat. No. 6,730,049 to Kalvert, the disclosure of which is incorporated herein by reference, describes a tunable and adjustable device for stabilizing tremors including a rigid splint for receiving a patient's hand, wrist and forearm, and at least one gyroscope removably and rigidly attachable to said splint and positionable for counter effecting the tremors. Also, a method for tuning and adjusting the device is provided which includes assessing the dynamic characteristics of the patient's tremors, assessing at least one activity the patient intends to perform with his/her hand, wrist, and arm which is subject to tremors, attaching the splint to the patient's hand, wrist, and arm that he/she intends to use for the at least one activity, and attaching and positioning the at least one gyroscope to the splint at least one location which counter effects the patient's tremors.

U.S. Pat. No. 6,695,794 to Kaiser, et al., the disclosure of which is incorporated herein by reference, describes a light weight, wearable, and balanced active tremor control system including a mount; a proof mass frame moveable with respect to the mount; at least one actuator on the proof mass frame for imparting a force on the mount; a motion sensor for detecting movement of the mount due to tremors; and a controller for driving the actuator in response to the motion sensor.

U.S. Pat. No. 6,458,089 to Ziv-Av, the disclosure of which is incorporated herein by reference, describes a method and device for reducing trembling of a limb of a human subject. The method comprises suspending a mass from the limb via a suspension configuration. The suspension configuration having an effective spring constant and/or a non-zero coefficient of damping in at least one direction such that the mass is driven to oscillate in the at least one direction out of phase relative to the trembling motion. A further embodiment includes a motion sensor to sense the motion of the limb, an actuator to generate the damping force, and a control unit that is responsive to the motion sensor and actuator to generate a damping force that alleviates trembling.

U.S. Pat. No. 6,039,290 to Wie, et al., the disclosure of which is incorporated herein by reference, describes control moment gyros in an array are rotated to reorient a satellite. A pseudo inverse control is employed that adds a term to a Moore-Penrose pseudo inverse to prevent a singularity.

U.S. Pat. No. 5,058,571 to Hall, the disclosure of which is incorporated herein by reference, describes a gyroscope firmly held against the back side of the human hand to reduce or eliminate the effect of naturally occurring tremors such as essential tremor or other tremor. The gyroscope is driven by an electric motor energized by batteries. The batteries are mounted near the periphery of the gyroscope to enhance the gyroscopic action. In a modified form of the invention the motor is not mounted on the back side of the hand but is a separate unit to which the gyroscope can be readily coupled and uncoupled.

U.S. Pat. No. 4,684,124 to Escher, the disclosure of which is incorporated herein by reference, describes a precessional exercising device utilizing a housing containing a spinning mass which forms the rotor of a motor for spinning the mass. The spin axis of the mass is perpendicular to upper and lower flat housing surfaces adapted to be held in the palm of the hand. Alternatively, the housing may be coupled to a remote handle by a linkage permitting rotation of the handle about two mutually orthogonal axes. Also, the housing containing the spinning mass may be coupled to a remote foot plate for similar rotation of the housing by movement of the foot. The housing containing the spinning mass may be affixed to a hinged deck upon which the upper part of the body may be secured for bending and twisting exercises. Exercise of the muscles is achieved by making accurate exercising movement which rotate the spin axis of the spinning mass within the housing, and by resisting the precession torque generated as a result of rotation of the spin axis of the spinning mass.

Additional background art and information includes IEC 60601-1—medical electrical equipment—Part 1: General requirements for basic safety and essential performance, 3$^{rd}$ Edition; Brown, Peck, "Energetics of Control Moment Gyroscopes as Joint Actuators," *Journal of Guidance, Control, and Dynamics*, Vol. 33, No. 6, pp. 1871-1883, 2009; Jarc, Kimes, Pearson and Peck, "The Design and Control of a Low-Power, Upper Limb Prosthesis," IEEE 32nd Annual Northeast Bioengineering Conference, April 2006; and, Carpenter and Peck, "Reducing Base Reactions With Gyroscopic Actuation of Space-Robotic Systems," *IEEE Transactions on Robotics*, Vol. 25, No. 6, pp. 1262-1270, December 2009; the specification sheet for the Model 750 Control Moment Gyroscope offered by Educational Control Products and available at wwwdotecpsystemsdotcom/controls_ctrlgyrodothtm and wwwdotmaelabsdotucsddotedu/mae171/controldocs/gyroscopedothtm; the disclosures of which are incorporated herein by reference.

SUMMARY OF THE INVENTION

An aspect of an embodiment of the invention relates to a gyroscopic apparatus which is capable of assisting and/or resisting movement of a user's body part, for example a hand and/or arm. In some embodiments of the invention, the apparatus produces up to 3-axis torques to assist and/or resist user movement. In some embodiments of the invention, movement of the user's hand and/or arm is assisted and/or resisted around a single joint axis. The handheld gyroscopic apparatus is provided with at least one control-moment gyroscope for imparting torque to a user's hand and/or arm. Optionally, a pair of control-moment gyroscopes is provided to the apparatus. In some embodiments of the invention, the pair of gyroscopes is configured as a scissored-pair.

In an embodiment of the invention, the gyroscope attempts to impart a specific and/or predetermined path of travel to the user, for example a straight line or a circle. It should also be noted that while various embodiments are described herein as being "handheld", the apparatus described are optionally used with other parts of the body, including feet, limbs, head and/or the torso.

An aspect of an embodiment of the invention relates to a method of operating a handheld gyroscopic apparatus wherein user movement is optionally modified by the apparatus based on sensed apparatus motion data and/or rehab data/program and/or based on previous user movement, for example to give a vector. In an embodiment of the invention, as a user, who is grasping, wearing or to whom the apparatus is attached, moves the apparatus at least one sensor gathers data regarding that movement. Optionally, the apparatus is attached to the user using a sock, a strap and/or Velcro®. The data is processed, optionally compared to a plan of desired movement, and the apparatus is instructed to modify user movement based on at least the processing of the sensed data. In an embodiment of the invention, user movement is adjusted by applying torque to the user through at least one control-moment gyroscope provided to the apparatus. Undesired and/or partially desired user movement is actively monitored and/or modified as the user moves the apparatus, in an embodiment of the invention.

An aspect of an embodiment of the invention relates to a system for exercise and/or rehabilitation and/or gaming which is provided with at least one handheld gyroscopic apparatus. In an embodiment of the invention, the handheld gyroscopic apparatus includes at least one control-moment gyroscope. The system comprises the handheld gyroscopic apparatus, a base unit and a means for establishing operative communication between them. Optionally, the base unit and/or the apparatus communicate with a global communications network such as the Internet. In some embodiments of the invention, the base unit also includes a video and/or audio output capability, for example for presenting exercises and/or games to the user. In some embodiments of the invention, electronics are provided to the base unit to at least process sensed data relayed to it from the handheld apparatus and determine commands to be sent back to the handheld apparatus to modify movement. For example, sensed data is compared to a predetermined plan and commands are sent to the apparatus to adjust user movement to more closely track the plan. In an embodiment of the invention, programming and/or plan data and/or sensed date are stored in a database or memory. Optionally, some or all of the database or memory is located in the apparatus. Optionally, some or all of the database or memory is located in the base unit.

There is thus provided in accordance with an exemplary embodiment of the invention, a gyroscopic exercise apparatus, comprising: at least one control-moment gyroscope; at least one motion sensor for sensing movement of the apparatus; at least one spindle motor for providing rotation to a rotor of the gyroscope; and, at least one reversible motor for providing rotation to at least one gimbal of the gyroscope.

In an embodiment of the invention, the apparatus further comprises a communications module for sending and receiving data.

In an embodiment of the invention, the apparatus further comprises an ergonomic housing.

In some embodiments of the invention, the apparatus comprises two gyroscopes. Optionally, the two gyroscopes are configured in a scissored pair.

In some embodiments of the invention, the apparatus comprises three gyroscopes.

In some embodiments of the invention, the apparatus comprises four gyroscopes. Optionally, the four gyroscopes are configured in two scissored pairs.

In some embodiments of the invention, sensed movement comprises at least one of force, nature, direction, orientation and/or acceleration of apparatus.

In some embodiments of the invention, the apparatus is configured to control the at least one control-moment gyroscope based on the sensing by the at least one motion sensor.

In some embodiments of the invention, the apparatus is configured to at least one of assist and resist the motion of a patient using the at least one control-moment gyroscope. Optionally, the at least one of assisting and resisting the motion is in response to sensing by the at least one motion sensor. In an embodiment of the invention, the apparatus is configured to apply the at least one of assistance and resistance in a single joint axis.

In some embodiments of the invention, the apparatus is configured to apply up to 3 axis torques to a body portion of a patient.

In some embodiments of the invention, the apparatus is configured to be handheld.

In some embodiments of the invention, the apparatus is configured to be removably attached to a body portion of a patient.

There is further provided in accordance with an exemplary embodiment of the invention, a system for exercise, comprising: at least one gyroscopic exercise apparatus including at least one control-moment gyroscope; and, a base unit in operative communication with the gyroscopic exercise apparatus.

In an embodiment of the invention, the system is configured with a wireless communication connection between the gyroscopic exercise apparatus and the base unit.

In an embodiment of the invention, the system is configured with a communication connection over a global communications network between the gyroscopic exercise apparatus and the base unit.

In an embodiment of the invention, the system further comprises at least one of a database and a memory having stored thereon a plan. In an embodiment of the invention, the system is configured to control the gyroscopic exercise apparatus according to the plan.

There is further provided in accordance with an exemplary embodiment of the invention, a method of rehabilitation, comprising: creating a rehabilitation plan; commencing exercise using at least one gyroscopic exercise apparatus; sensing motion of user applied to the apparatus; comparing sensed motion to the rehabilitation plan; and, modifying user motion to more closely track the plan by adjusting operation of at least one control moment gyroscope of the apparatus.

In an embodiment of the invention, at least one of the commencing, sensing, comparing and modifying is monitored remotely.

In an embodiment of the invention, the exercise is a game. Optionally, a game is at least one of shooting, preventing water from spilling and driving.

In an embodiment of the invention, adjusting includes at least one of altering a rotor rotation of at least one gyroscope of the apparatus and altering a gimbal rotation of at least one gyroscope of the apparatus.

In an embodiment of the invention, the plan includes at least one of a desired motion track or path, speed, orientation, angular velocity and acceleration.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

Figure 1:
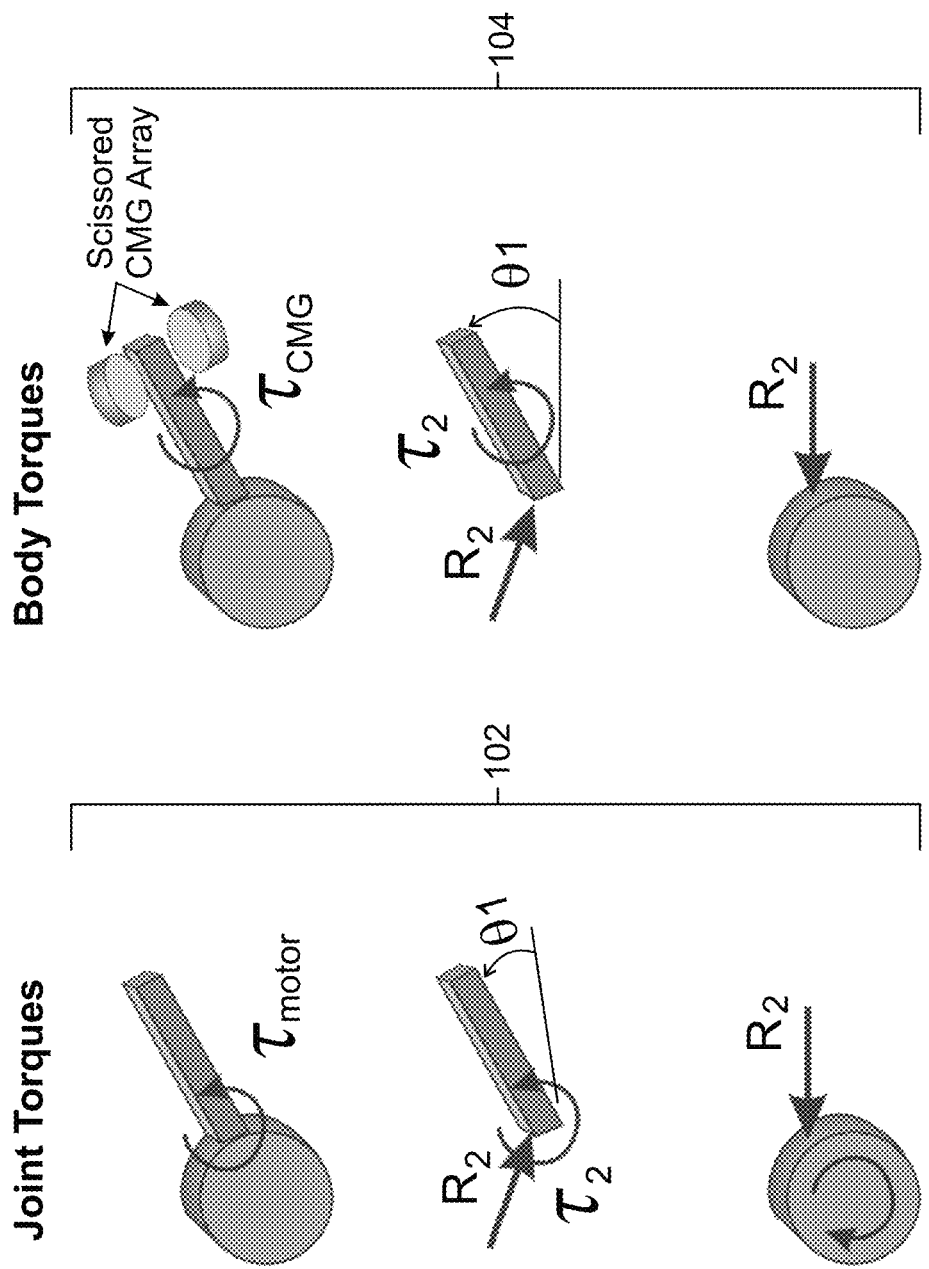
FIG. 1 is a conceptualized representation of joint torques versus body torques during control-moment gyroscope operation.

DESCRIPTION OF SPECIFIC EMBODIMENTS
OF THE INVENTION

The present invention, in some embodiments thereof, relates to exercise, rehabilitation and/or entertainment apparatuses and/or methods for using them and, more particularly, but not exclusively, to an active, handheld exercise, rehabilitation and/or entertainment apparatuses and/or methods of use. Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

General Principles of Operation of Some Embodiments of the Invention

In an embodiment of the invention, a gyroscopic apparatus is provided to actively oppose and/or assist movement of a portion of a user. Optionally, the portion of the user is an arm and/or hand and/or the gyroscopic apparatus is handheld. In some embodiments of the invention, movement is opposed, facilitated, nudged, triggered and/or reminded by the apparatus by generating torque. For example, the apparatus could give an initial push to user motion, whether sufficient or not to achieve the desired motion and/or the apparatus could give correctional nudges to patient movement to more closely track a desired user movement vector ad/or rehabilitation plan. Optionally, force is created around one axis. In some embodiments of the invention, the gyroscopic apparatus is in the form of a game controller, for example like a Wii® or Xbox 360® game console controller. The gyroscopic apparatus is used for exercise, rehabilitation and/or entertainment applications, in some exemplary embodiments of the invention. Optionally, the gyroscopic apparatus is used to provide haptic feedback for games and other virtual-reality applications. In some embodiments of the invention, the gyroscopic apparatus is removably attached to a body part of a user, for example being strapped to the hand, wrist, foot and/or ankle.

As described more fully below, in an embodiment of the invention the handheld gyroscopic apparatus is provided with at least one control-moment gyroscope ("CMG") based actuator. In some embodiments of the invention, the handheld gyroscopic apparatus is also provided with at least one of: gyro/accelerometer-based kinematics measurement sensors and/or a computational platform that affects closed-loop control of the handheld gyroscopic apparatus and its system. CMGs are commonly used in spacecraft attitude control systems instead of, or in addition to attitude-adjustment rocket engines. As the rotor tilts under a closed-loop control system, the changing angular momentum causes a gyroscopic torque that rotates the spacecraft in a specific manner. Beyond controlling spacecraft attitude however, research has been conducted to investigate the feasibility of using CMGs to actuate robotic arms used in space (Brown, Peck, "Energetics of Control Moment Gyroscopes as Joint Actuators," *Journal of Guidance, Control, and Dynamics*, Vol. 33, No. 6, pp. 1871-1883, 2009), as well as arm prostheses (Jarc, Kimes, Pearson, and Peck, "The Design and Control of a Low-Power, Upper Limb Prosthesis," IEEE 32nd Annual Northeast Bioengineering Conference, April 2006).

Referring to FIG. 1, a conceptualized representation of joint torques 102 versus body torques 104 during CMG operation is shown. FIG. 1 demonstrates that the CMG generates inertial reaction forces caused by a spinning object not at the center of mass. CMGs create body torques, while the motion of the arm remains the same. Only the torque caused by the off-center reaction force needs to be absorbed using body torques.

Figure 2:
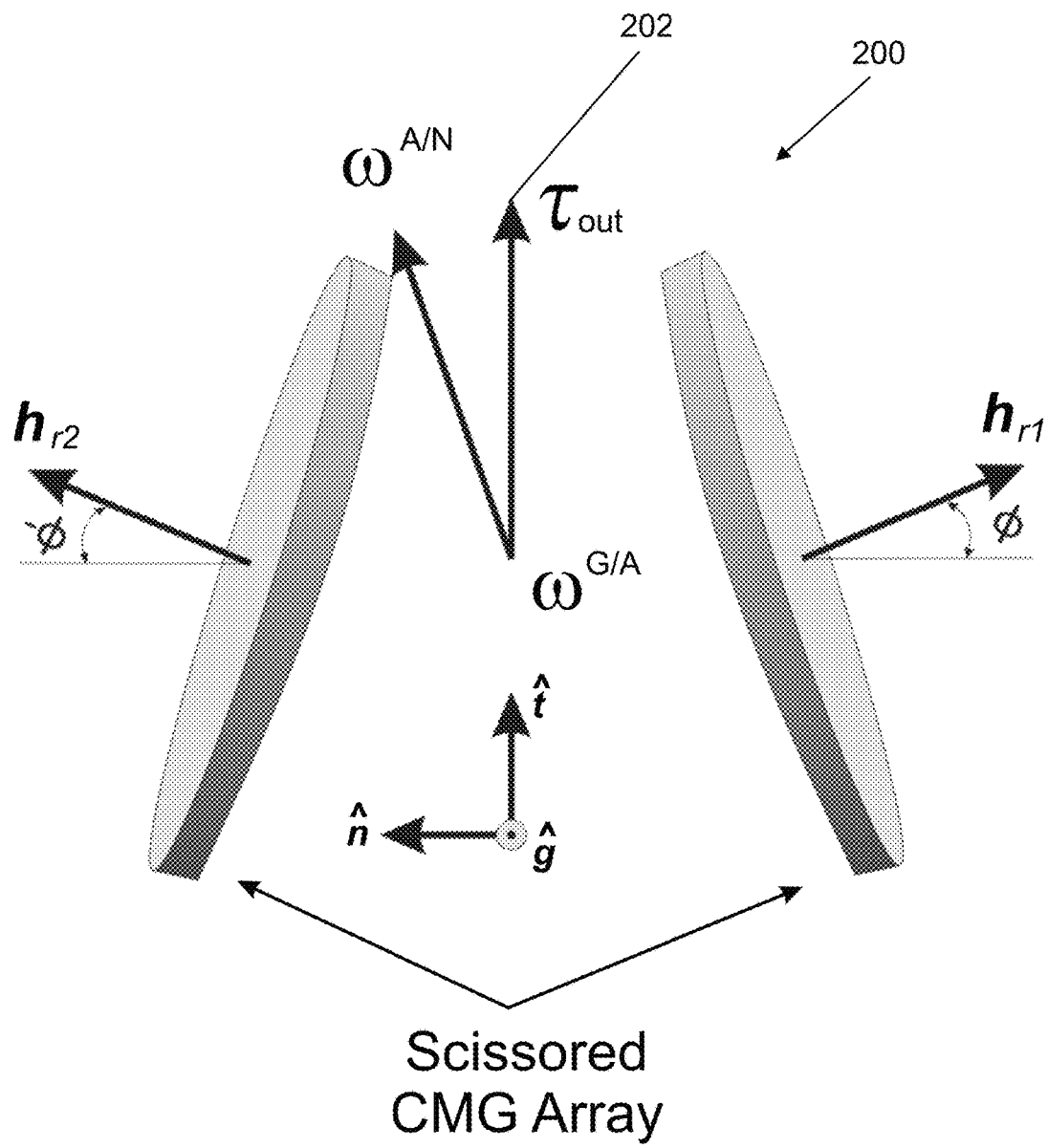
FIG. 2 is a scissored pair control-moment gyroscope configuration, in accordance with an exemplary embodiment of the invention.

In an embodiment of the invention, a "scissored pair" CMG configuration, shown and described in more detail with respect to FIG. 2, is provided to a handheld gyroscopic apparatus to remove gyroscopic effects and off-axis torques. FIG. 2 is a scissored pair CMG configuration 200, in accordance with an exemplary embodiment of the invention. The scissored pair CMG 200 produces torque only about a joint axis by connecting two CMGs that minor each other. The torques add together along a single axis 202, which can be aligned with the joint, and cancel along other directions. In addition, this configuration 200 is advantageous, in some embodiments of the invention, because it does not have internal singularities.

Exemplary Gyroscopic Apparatuses

It should be understood that while multiple embodiments are described using more than one CMG, a gyroscopic apparatus optionally includes a single CMG, in an exemplary embodiment of the invention. In some embodiments of the invention, a single gimbal is used with the CMG. In some embodiments of the invention, a plurality of gimbals is used with the CMG, for example two. Operational configurations include a simple rigid body, a reaction wheel, a gyroscopic torque, and/or a reaction/gyroscopic positioner, in some embodiments of the invention.

Figure 3:
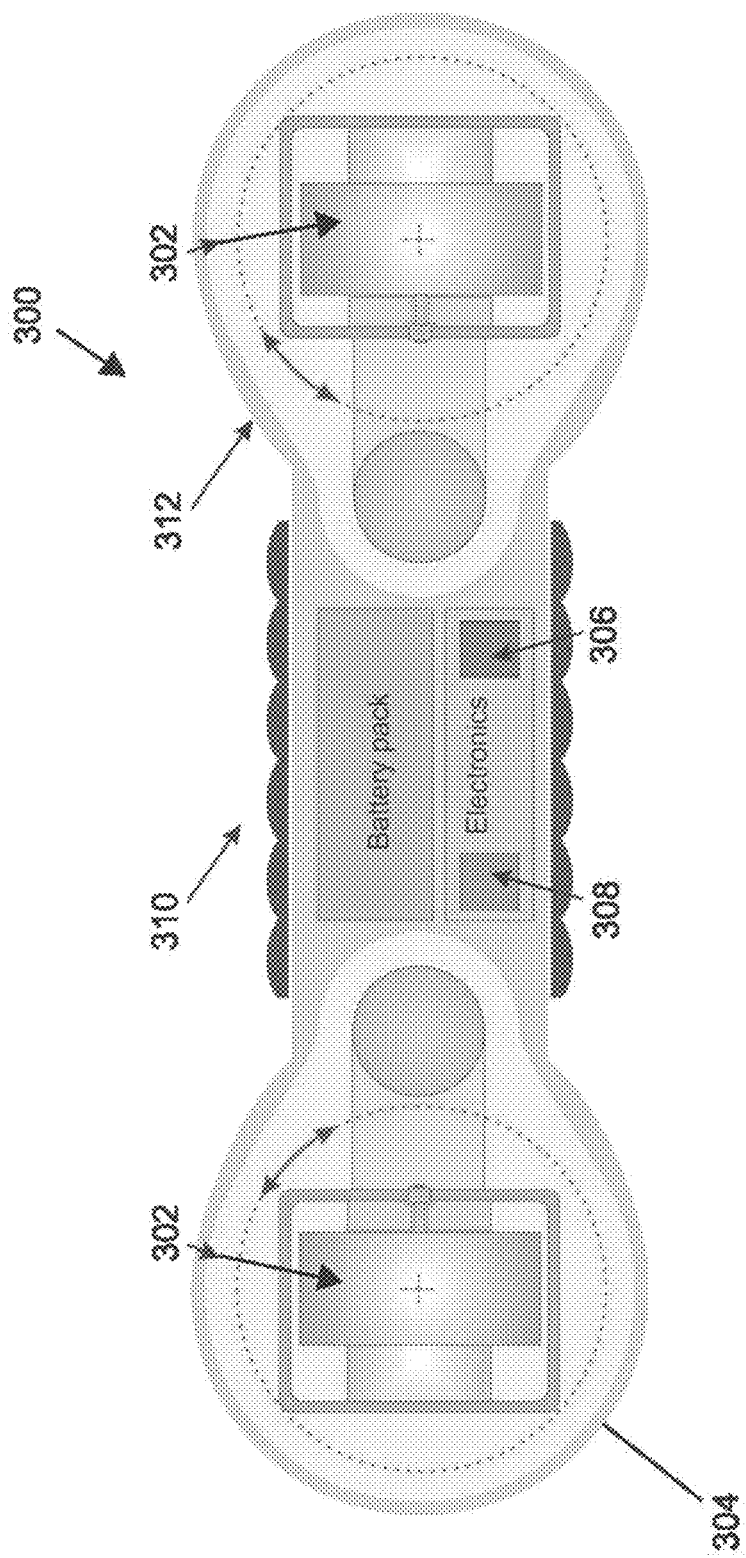
FIG. 3 is a schematic diagram of a handheld gyroscopic apparatus, in accordance with an exemplary embodiment of the invention.

FIG. 3 is a schematic diagram of a handheld gyroscopic apparatus 300, in accordance with an exemplary embodiment of the invention. The actuator for the apparatus 300 is comprised of two spinning rotors 302 and at least one motorized gimbal 304 (for each rotor 302) which tilts the rotors' angular momentum to produce gyroscopic torques, in an embodiment of the invention. Features of the actuator are shown and described in more detail with respect to FIGS. 4 and 5.

In some embodiments of the invention, apparatus 300 is provided with at least one sensor 306, for detecting force, nature, direction, orientation and/or acceleration of apparatus. Apparatus 300 is also provided with a communication module 308, for example to communicate with a gaming and/or rehabilitation system and/or an external controller, in some embodiments of the invention. Optionally, additionally and/or alternatively, the communication module enables wireless communication. Electronics within the apparatus 300 process sensing data (e.g. inertial measurement) from the at least one sensor 306, provide real-time control of the CMGs, and/or send/receive communication using communication module 308, in an embodiment of the invention.

It should be understood that because the apparatus 300 is intended to be handheld and optionally used in physically active settings, apparatus 300 is optionally adapted for user comfort and ease of use. For example, in an embodiment of the invention, an ergonomic gripping surface 310 is provided to the exterior of apparatus 300. In some embodiments of the invention, components of the apparatus 300 are enclosed in a housing 312 which is ergonomic and/or aesthetically pleasing. It should be understood that the housing 312, and consequently the apparatus 300, is optionally provided in an array of shapes and sizes depending on the user and/or the intended use. For example, housing 312 optionally takes the shape of a steering wheel (shown and described in more detail with respect to FIG. 17) for a driving game. In some embodiments of the invention, apparatus 300 is provided with at least one button for executing commands related to control of a system and/or a game and/or an exercise.

Figure 4:
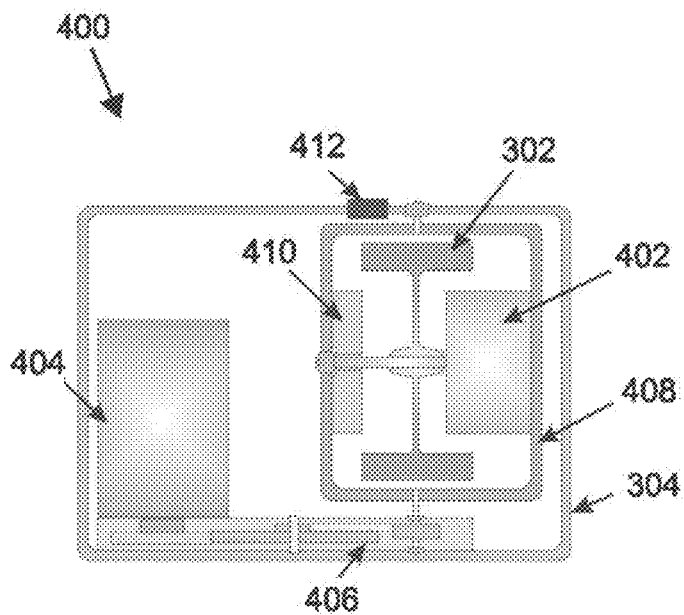
FIG. 4 is a side cross sectional schematic view of a gyroscopic assembly of a handheld gyroscopic apparatus, in accordance with an exemplary embodiment of the invention.
Figure 5:
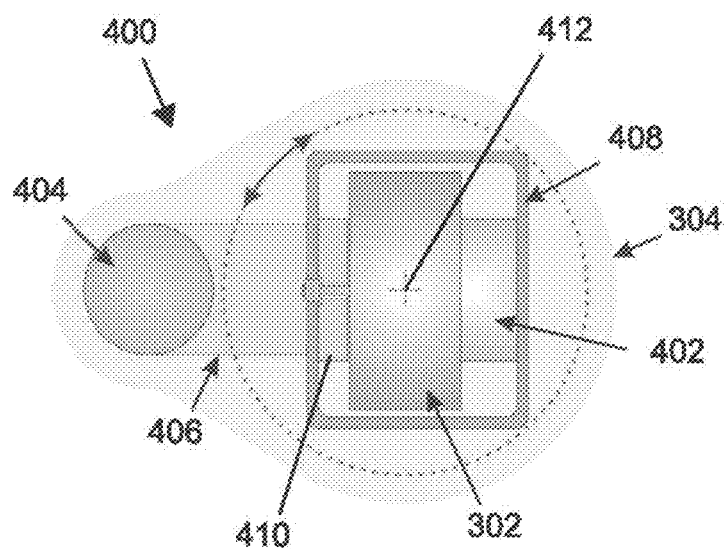
FIG. 5 is a top cross sectional schematic view of a gyroscopic assembly of a handheld gyroscopic apparatus, in accordance with an exemplary embodiment of the invention.

FIG. 4 is a side cross sectional schematic view of a gyroscopic assembly 400 of a handheld gyroscopic apparatus 300, in accordance with an exemplary embodiment of the invention. In an embodiment of the invention, rotor 302 spins to create rotational forces that create torque. A spindle motor 402 is optionally used to drive the rotor 302. In some embodiments of the invention, the rotor weighs 150 to 200 grams. In some embodiments of the invention, the rotor 302 spins at 15,000 to 30,000 rpm. Optionally, the rotor 302 is constructed of metal, such as brass. In some embodiments of the invention, a reversible rotation motor 404 is provided to the assembly 400 with a gearbox 406 for rotating a gyroscope frame 408 to a controlled angle of up to ±90° or more. In some embodiments of the invention, a counterweight 410 is used opposite the spindle motor 402.

Also shown is a sensor 412, which in an embodiment of the invention is a sensor 306, optionally an angular position sensor, which is provided with operative communication with the electronics of apparatus 300. In an embodiment of the invention, sensor 412 is used to determine the exact angular position of the gyroscope assembly 400 to implement scissored-pair operation, such as described with respect to FIG. 2, with the other gyroscope assembly in the apparatus 300. A standard servo motor, of the type used in radio-controlled airplanes may substitute the gimbal's rotation motor 404, gear box 406, and sensor 412, in some embodiments of the invention.

Figure 6:
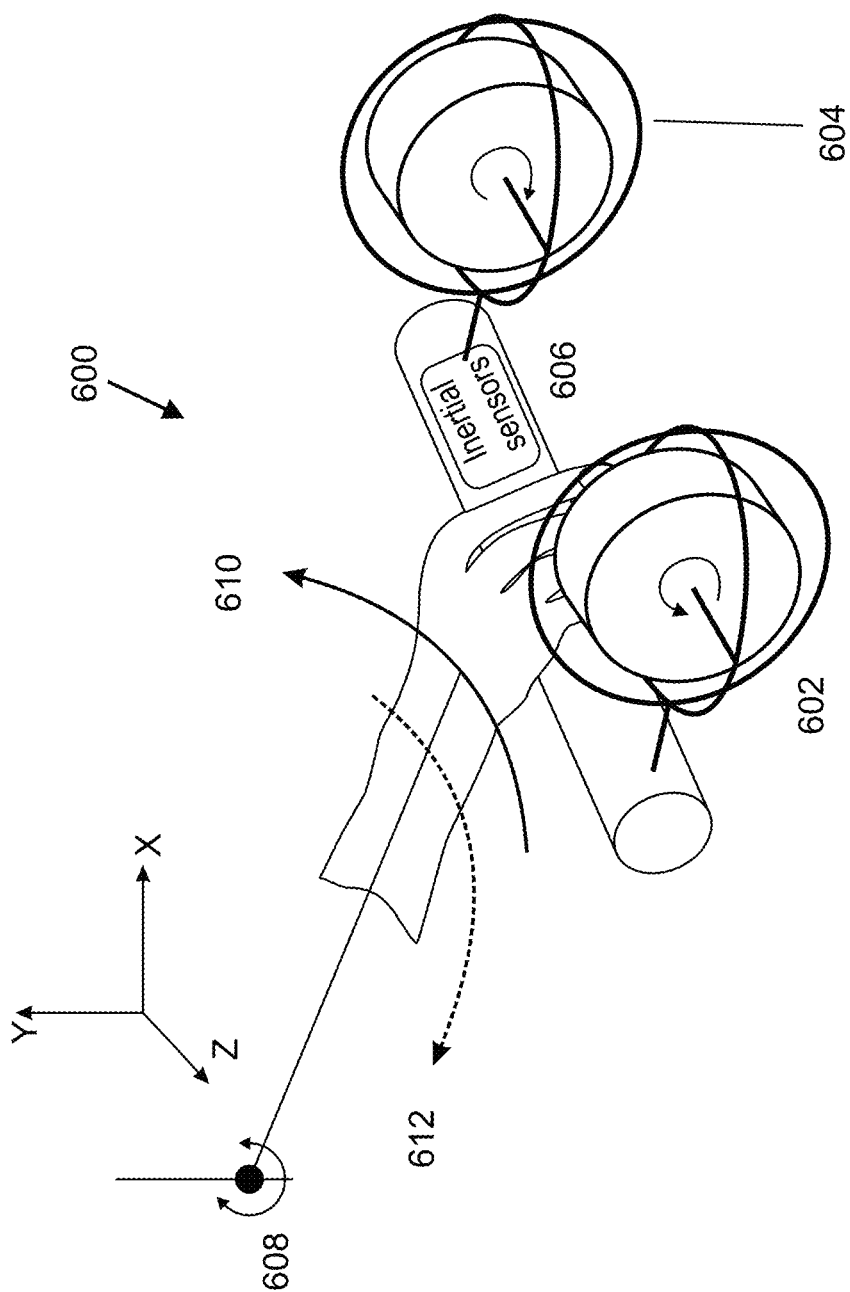
FIG. 6 is a schematic diagram showing a handheld gyroscopic apparatus in operation, in accordance with an exemplary embodiment of the invention.
Figure 7:
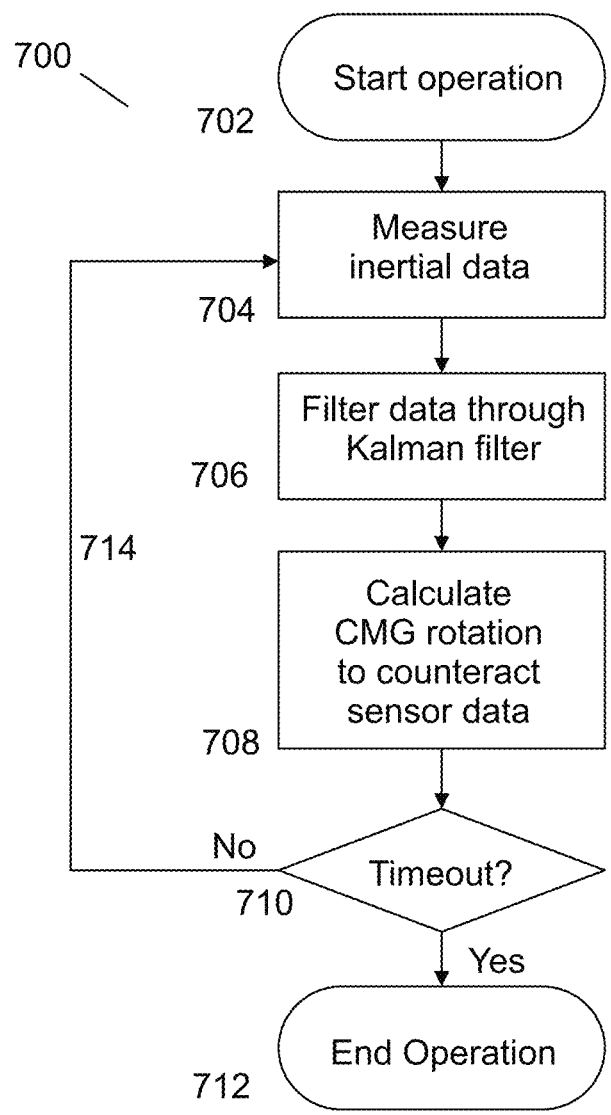
FIG. 7 is a flowchart showing a method of operating a handheld gyroscopic apparatus, in accordance with an exemplary embodiment of the invention.

FIG. 6 is a schematic diagram showing a handheld gyroscopic apparatus 600 in operation, in accordance with an exemplary embodiment of the invention. Two gyroscopes 602, 604 are provided to apparatus 600 opposite one another on the apparatus 600 and spinning in opposite directions, in some embodiments of the invention. As described elsewhere herein, gyroscopes 602, 604 are mounted as a scissored pair, in an embodiment of the invention. FIG. 7 is a flowchart 700 showing a method of operating a handheld gyroscopic apparatus 300, 600, in accordance with an exemplary embodiment of the invention. Operation of apparatus 300, 600 is commenced 702 by powering the various components of the apparatus, including the gyroscopes. In an embodiment of the invention, as a user imparts movement 610 the apparatus 600, inertial data is measured 704 using at least one sensor 606. The data is optionally filtered 706 through a Kalman filter and the rotation of the gyroscope required to counteract or assist the movement 610 is calculated 708. The gyroscopes introduce opposing torque 612 to the user movement 610 as a result of the calculating 708. In some embodiments of the invention, the introduction 612 of torque is used to assist movement 610 as a result of the calculating 708. In an embodiment of the invention, rotating the gimbals of the gyroscopes 602, 604 produces torque only about a joint axis 608. In some embodiments of the invention, apparatus 300, 600 is provided with an automatic shut off whereby if motion of the apparatus 300, 600 ceases for a predetermined amount of time 710, the gyroscopes and/or other components of the apparatus 300, 600 cease operation 712. If motion of the apparatus 300, 600 is sustained such as it would be in a game and/or an exercise then the apparatus 300, 600 continues 714 to measure 704 inertial data and responds accordingly. In an embodiment of the invention, apparatus 300, 600 operates in a closed-loop process.

In an embodiment of the invention, an apparatus is provided with a three (3) CMG array to produce torques on three (3) axes. In an embodiment of the invention, the three CMGs provide pitch, yaw and/or roll control of movement. For a lone yaw movement, all three CMGs are optionally used. In some embodiments of the invention, two CMGs are used for pitch and/or roll, with the two CMGs rotating in opposite directions. Distinct planes of rotation are chosen by selecting which pair of CMGs to activate, in an embodiment of the invention. In an embodiment of the invention, the third CMG is used to refine the angle of pitch and/or roll.

In an embodiment of the invention, four (4) CMGs are used in two scissored pairs. Torques in three axes are produced using the 4 CMGs, in an embodiment of the invention. Optionally, 4 CMGs are used because singularities occur less often and performance is easier to predict. In an embodiment of the invention, at least one CMG is used against another to provide a resultant torque direction. It should also be understood that various weights and/or spins can be optionally used for different CMGs to provide different effects to the user.

Exemplary Systems

Figure 8:
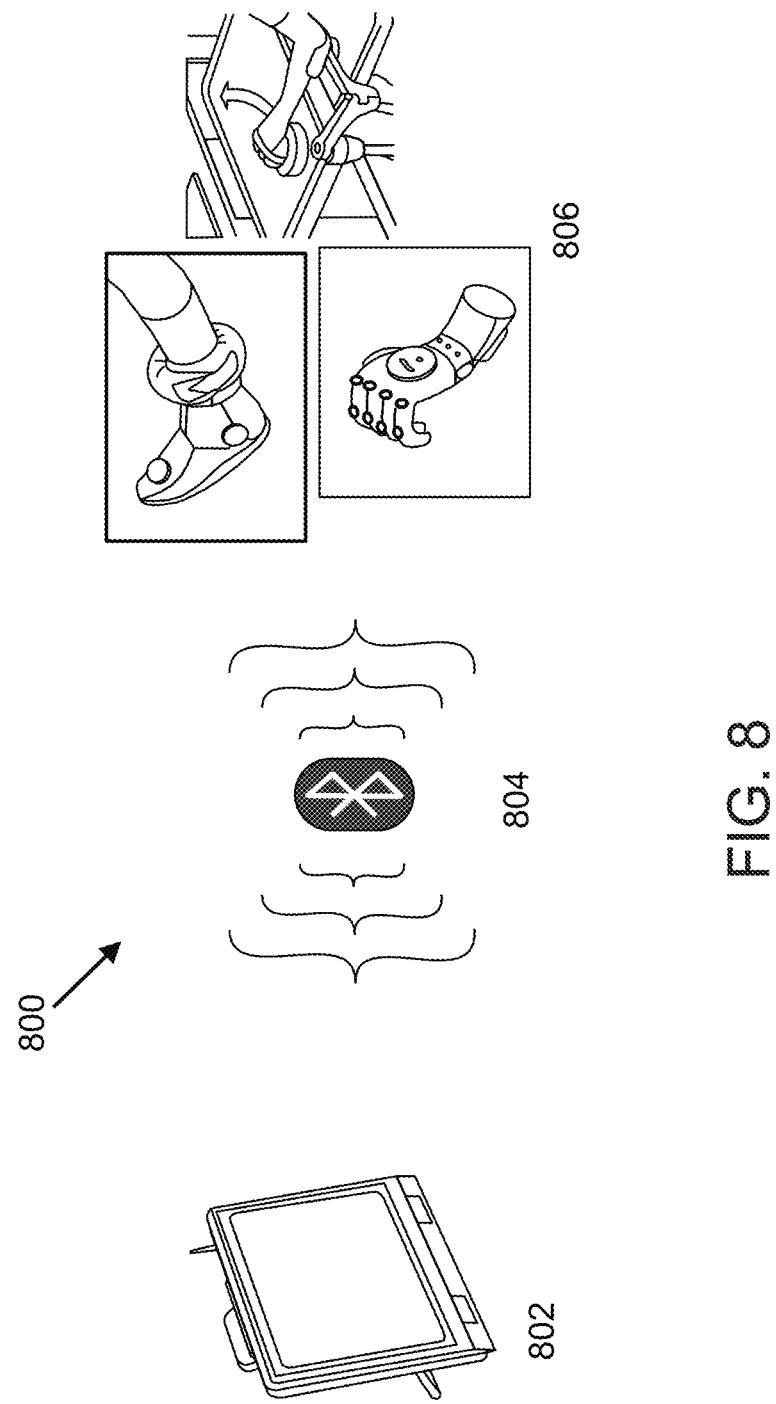
FIG. 8 is a schematic diagram showing a rehabilitation system, in accordance with an exemplary embodiment of the invention.

FIG. 8 is a schematic diagram showing a rehabilitation system 800, in accordance with an exemplary embodiment of the invention. In some embodiments of the invention, a base unit 802 is provided which includes at least a video display for presenting information and/or activities to a user of the system 800. Optionally, base unit 802 includes at least one of audio output, a controller, a wireless communication module, a wired communication module, data storage, at least one data transfer port and/or an interface for controlling the unit 802. In some embodiments of the invention, system 800 is in operative communication with a network, for example a global communications network like the Internet. System 800 is provided with operative communication 804 with at least one gaming and/or exercise and/or rehabilitation apparatus 806 utilized by a system 800 user. In some embodiments of the invention, apparatus 806 communicates wirelessly within system 800. In some embodiments of the invention, apparatus 806 is a handheld gyroscopic apparatus, such as those apparatuses 300, 600 described elsewhere herein. Apparatus 806 is optionally active or passive or both intermittently, depending on the situation.

In an embodiment of the invention, system 800 is adapted for use in a home setting. For example, the components (e.g. 802, 804, 806) are relatively mobile, inexpensive, easy to set up, and/or modestly sized in comparison to traditional commercial rehabilitation/health care/entertainment settings. In some embodiments of the invention a camera is used to track user motion. Optionally, a Kinect® or Wii® type motion sensing system is used to track user motion. Optionally, a marker (e.g. a flashing light) on at least one of the CMGs is used to track its motion. It should be understood that while system 800 is intended for use in a home, in an embodiment of the invention, it can be used virtually in any setting. While system 800 is typically operated by a user at home, in some embodiments of the invention the user is monitored remotely using the communications ability of the system 800. Optionally, at least one medical professional such as a doctor or therapist monitors the patient.

System 800 is provided with games and/or exercises to present to the user, in accordance with an exemplary embodiment of the invention. Exemplary games are discussed in more detail with respect to FIGS. 12-17. Games can be used to provide motivation to the user and/or to provide exercise which is also entertaining. In some embodiments of the invention, system 800 is adapted for games and/or exercises to be played by or interacted with a plurality of users, for example over the Internet.

Figure 9:
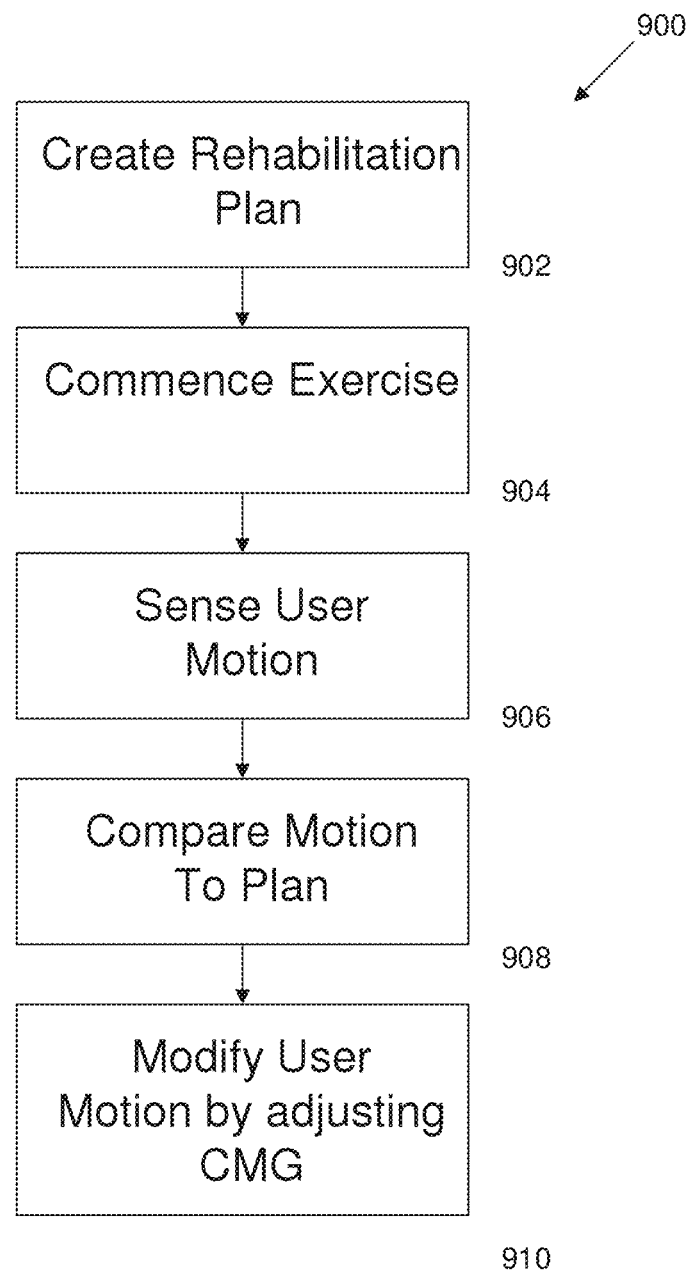
FIG. 9 is a flowchart showing a method of rehabilitation, in accordance with an exemplary embodiment of the invention.

In operation, as a user performs exercise and/or gaming, apparatus 806 makes adjustments to the movement of the apparatus 806 to execute an exercise and/or rehabilitation plan, in accordance with an embodiment of the invention. FIG. 9 is a flowchart showing a method of rehabilitation, in accordance with an exemplary embodiment of the invention. Assuming a user of the system 800 is being rehabilitated, a rehabilitation plan is created (902) for the user. The plan could optionally include desired user motion track, speed, orientation, angular velocity and/or acceleration of user motion and is optionally stored in a database or memory. In some embodiments of the invention, plan information is retrieved when actual sensed user motion is compared to the plan to determine how to adjust operation of the gyroscopic apparatus. The user accesses the system 800 and commences (904) an exercise and/or rehabilitative game using at least one apparatus 806, in an embodiment of the invention. As the user exercises, motion of the patient is sensed (906) via the apparatus 806, in an embodiment of the invention. In an embodiment of the invention, sensed motion is compared (908) to the created (902) plan. User movement not in accordance with the plan is modified by the system 800 by adjusting (910) operation of the gyroscopes in the apparatus 806 which in turn apply counterforce to the user movement and/or assist user movement in an attempt to achieve plan compliance. Specific gyroscopic adjustment methods are described in more detail with respect to FIGS. 10 and 11.

Figure 10:
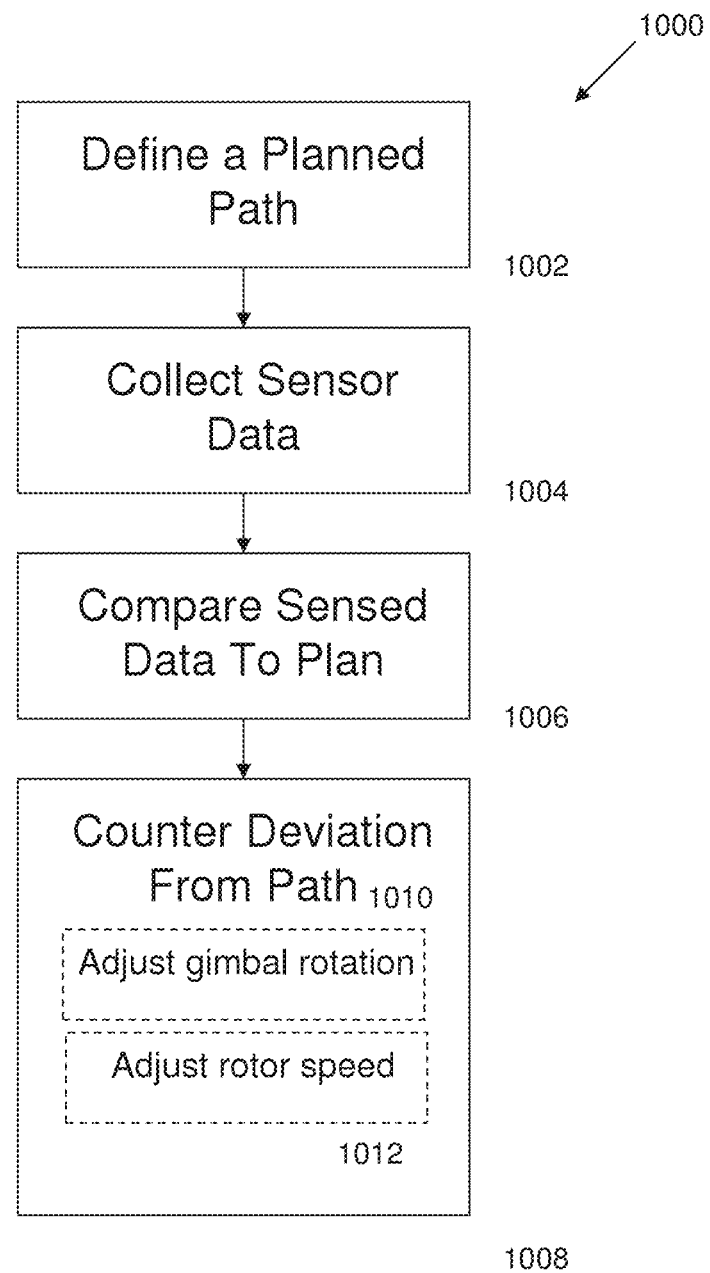
FIG. 10 is a flowchart showing a method of rehabilitation, in accordance with an exemplary embodiment of the invention.

FIG. 10 is a flowchart showing a method of rehabilitation when a user deviates from a defined (1002) path, in accordance with an exemplary embodiment of the invention. Planned path can optionally include not only x, y, and z coordinates of the apparatus' motion, but the planned path can also include virtually variable which can be sensed. For example, a planned path can include an orientation of apparatus 806 element. As another example, a planned path could optionally include an acceleration of apparatus 806 element. As a user is moving apparatus 806, the apparatus is continuously collecting (1004) sensor data. As described elsewhere herein, data can include information on the apparatus' 806 angular motion, acceleration, orientation, direction and/or other movement related variables. Apparatus 806 sensed data which is collected (1004) is compared (1006) to the planned path, in an embodiment of the invention. Deviation from the planned path is countered (1008) by apparatus 806, for example, by using a rotation motor 404 to adjust (1010) the rotation of each corresponding gimbal 408 and/or using a spindle motor 402 to adjust (1012) the speed of rotation of each corresponding rotor 302.

Figure 11:
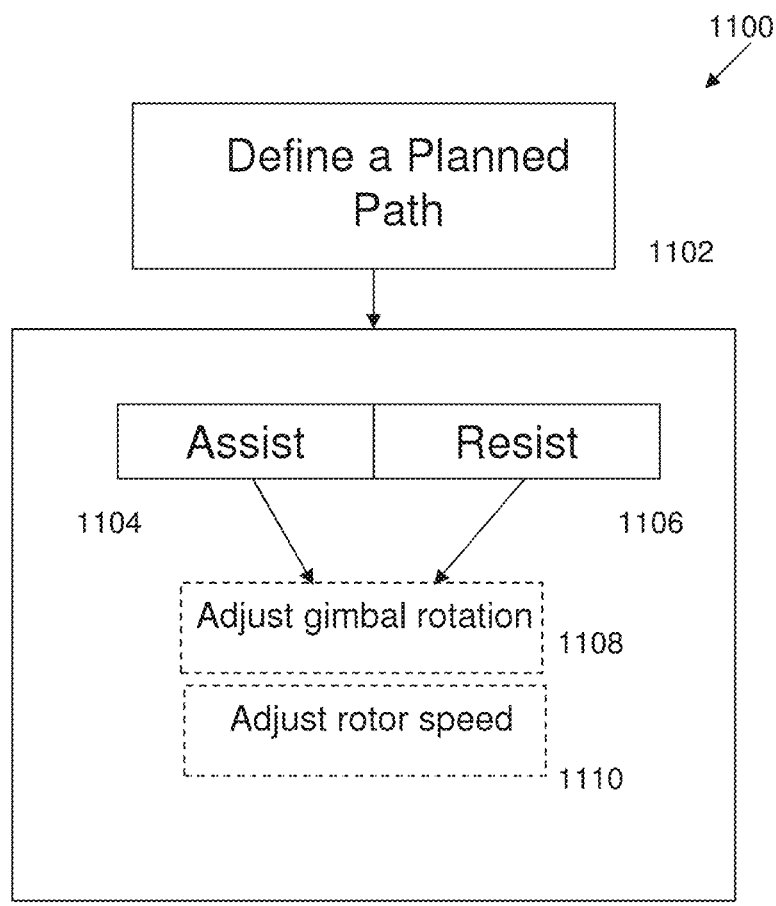
FIG. 11 is a flowchart showing a method of rehabilitation, in accordance with an exemplary embodiment of the invention.

FIG. 11 is a flowchart showing a method of rehabilitation wherein the apparatus 806 assists or resists movement in a defined path, in accordance with an exemplary embodiment of the invention. As described elsewhere herein, various parameters of a path can be defined (1102) to establish a "preferred" path for apparatus 806. Motion in that path can be facilitated (1104) by apparatus 806, for example to assist a user with motor dysfunction, and/or movement in that path can be resisted (1106) by apparatus 806, for example to build user strength. Adjusting gimbal rotation 1108 and/or rotor rotation (1110) are used as in FIG. 10 to alter the torque produced by apparatus 806 to urge the user in a desired fashion.

It should be understood that the methodologies described in FIGS. 10 and 11 are not mutually exclusive and are optionally used in combination to assist and/or resist movement of the user in a path and also to attempt to maintain user compliance with the path.

In some embodiments of the invention, user motion is tracked and/or stored for analysis. Optionally, tracked user motion is translated to a range of motion. Range of motion of the user can be increased, in an embodiment of the invention, using the system 800 to adjust apparatus 806 CMG operation to assist the user as the user approaches the edges of the user's stored range of motion, moving the patient further in the path, and ideally increasing the user's range of motion over time.

Figure 12:
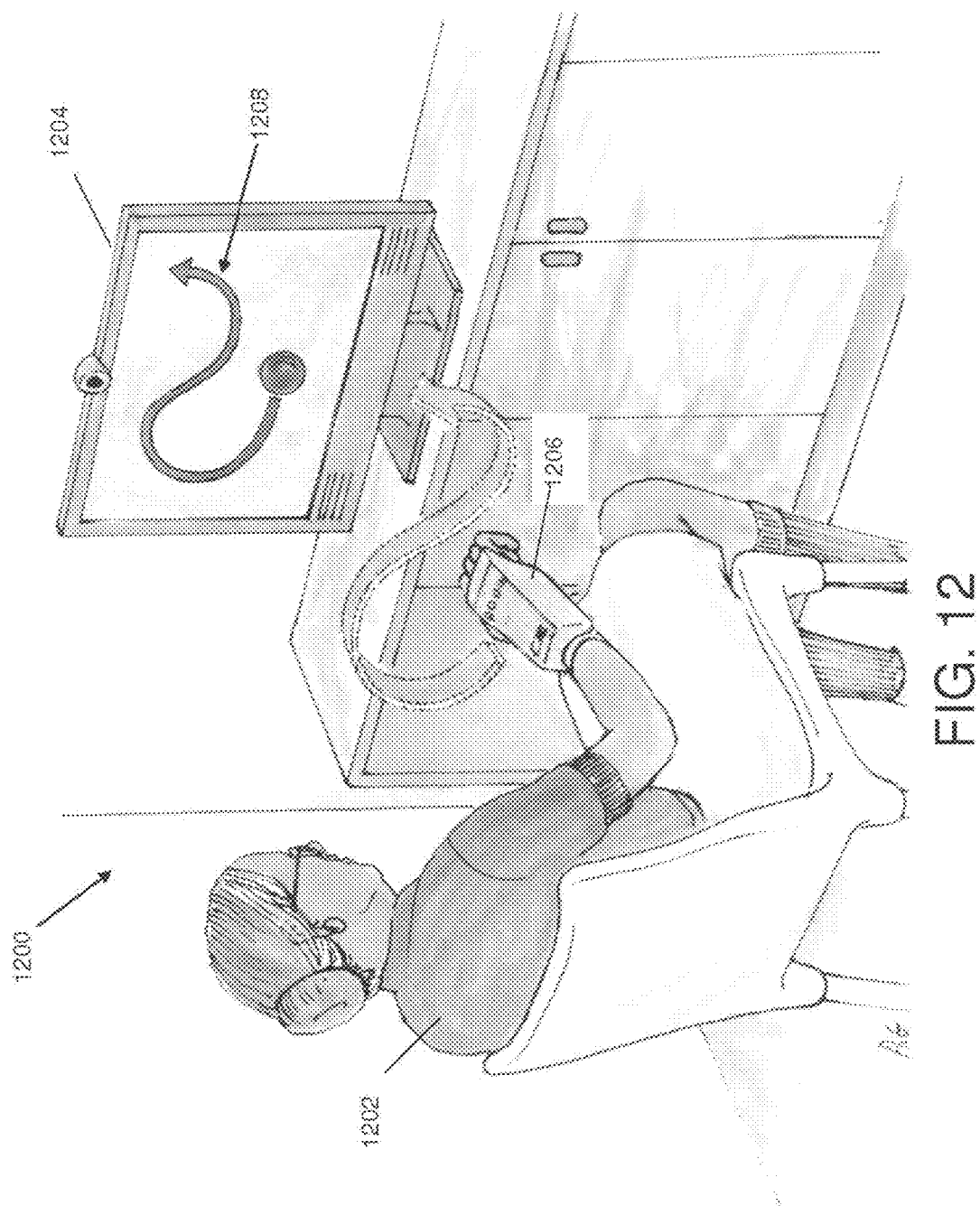
FIG. 12 shows a rehabilitation system in use by a patient, in accordance with an exemplary embodiment of the invention.

FIG. 12 shows a rehabilitation system 1200 in use by a patient 1202, in accordance with an exemplary embodiment of the invention. An exercise/game is shown on the base unit 1204 wherein the patient 1202 needs to move her arm to parallel the path 1208 shown to her on the video display of the base unit 1204. System 1200 is provided with a handheld gyroscopic apparatus 1206 (potentially an apparatus worn and/or strapped onto the hand) which operates in a fashion similar to apparatus 300, 600, 806 described elsewhere herein. Namely, as the patient 1202 moves her hand to follow the path 1208, deviations from the path are countered by the apparatus 1206 adjusting its CMG operation to attempt to force the patient back onto the path. In an embodiment of the invention, patient movement along the path is resisted or assisted by the apparatus 1206.

Figure 13:
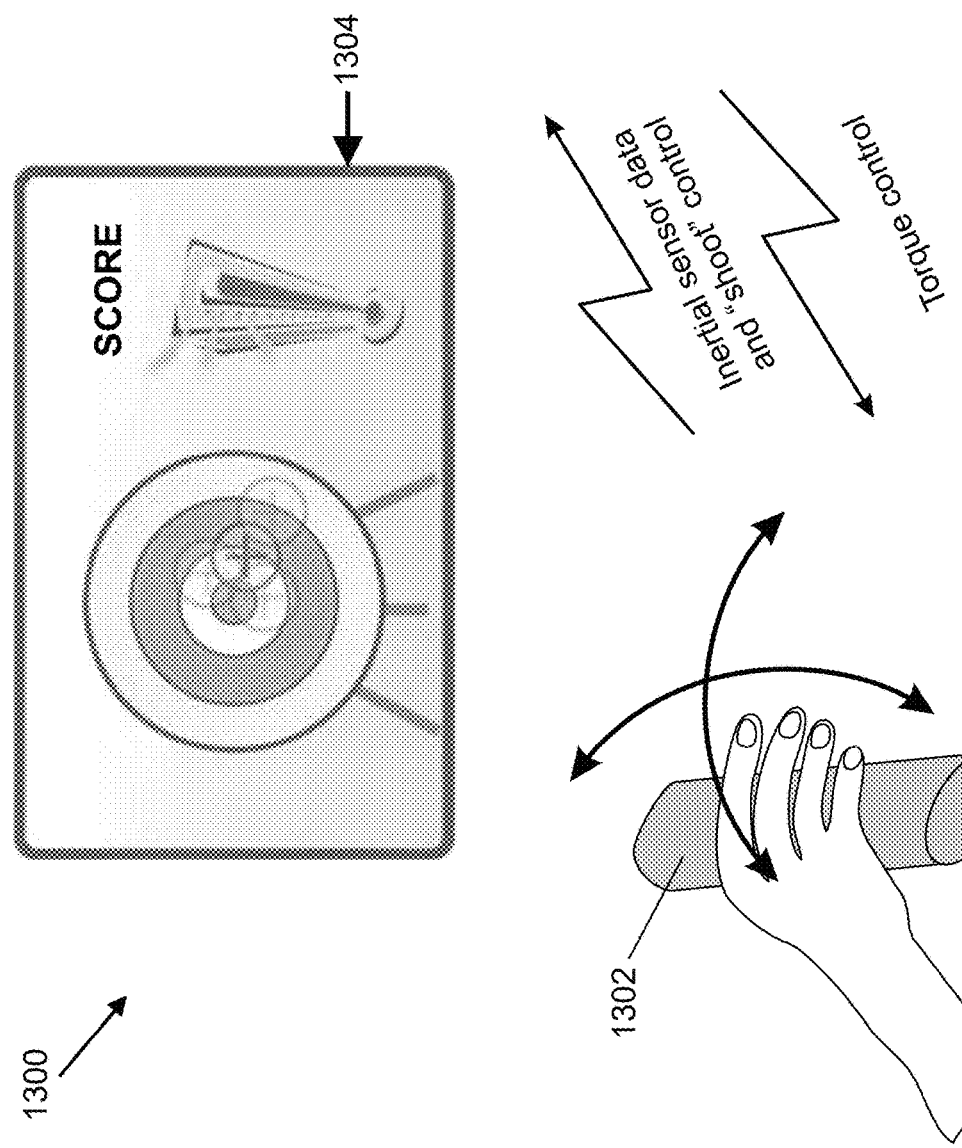
FIG. 13 is a schematic diagram of a shooting game played with a handheld gyroscopic apparatus, in accordance with an exemplary embodiment of the invention.

FIG. 13 is a schematic diagram of a shooting game 1300 played with a handheld gyroscopic apparatus 1302, in accordance with an exemplary embodiment of the invention. In an embodiment of the invention, game related video and/or audio is presented to a user on a base unit 1304. Base unit 1304 is provided with functionality which is at least to the level of gaming consoles, for example it optionally includes user interface controls, a communications module, input and/or output ports, electronics, a processor or controller, and/or data storage. In an embodiment of the invention, apparatus 1302 is wireless, and wirelessly communicates with base unit 1304. In some embodiments of the invention, apparatus 1302 is provided with a housing which is relevant to the game, for example for a shooting game, the apparatus 1302 is shaped like a gun or a bow. Base unit 1304 communicates with a global communications network, for example the Internet, for exporting and importing data and/or for permitting the user to interact with people located in remote locations, in some embodiments of the invention.

Figure 14:
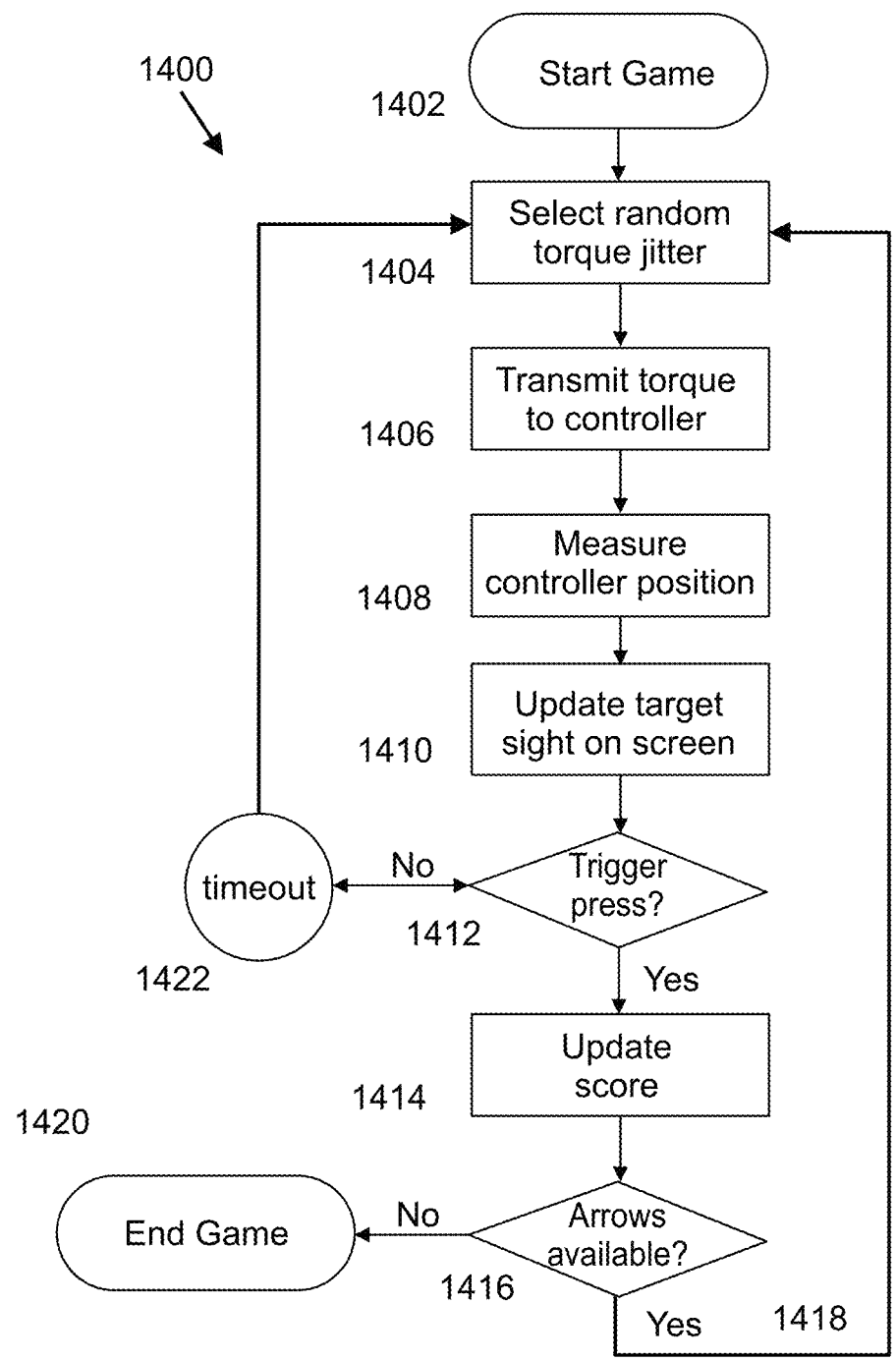
FIG. 14 is a flowchart showing a method of playing a shooting game with a handheld gyroscopic apparatus, in accordance with an exemplary embodiment of the invention.

FIG. 14 is a flowchart showing a method 1400 of playing the shooting game 1300 with handheld gyroscopic apparatus 1302, in accordance with an exemplary embodiment of the invention. The game 1300 is started (1402) by the user, for example by browsing menus presented on the base unit 1304 and selecting the game 1300 from a list of other options, games and/or exercises. An apparatus 1302 torque jitter is optionally selected (1404) to cause the apparatus 1302 to become actively unsteady in the hand of the user, in an embodiment of the invention. The selected (1404) torque is transmitted (1406) to the apparatus 1302 (or in some embodiments of the invention, the apparatus 1302 performs the selecting (1404)), in an embodiment of the invention. As the user moves the apparatus 1302 in an attempt to shoot a target presented on base unit 1304, at least one sensor on the apparatus 1302 measures (1408) movement variables of the apparatus 1302. Sensed data is processed and the sight or reticle displayed on the base unit 1304 is updated (1410) based on the sensed movement of the apparatus 1302, in an embodiment of the invention. Naturally, the user is moving the apparatus 1302 while it is under the influence of torque influences exerted on it by the CMG in the apparatus 1302. Optionally, processing is performed by a controller located in the base unit 1304. Optionally, processing is performed by the apparatus 1302 itself. In an embodiment of the invention, the user presses (1412) a trigger or button on the apparatus 1302 to initiate a "shot" at the target. Based on the accuracy of the user's shot, a score is optionally awarded (1414) to the user. In some embodiments of the invention, the score is tracked during the game and/or is stored for analysis and/or to motivate the user, for example to have the user strive to beat a high score. Assuming that within the context of the game, it is determined (1416) that the gun or bow has ammunition left, the user can restart (1418) the shooting process with a selected torque jitter added to the apparatus 1302 to increase the user's level of exercise. In an embodiment of the invention, if the user fails to pull the trigger or execute a shot, the game times out (1422) and/or optionally resets. In some embodiments of the invention, if it is determined (1416) that there is no ammunition left, the game is ended (1420).

Figure 15:
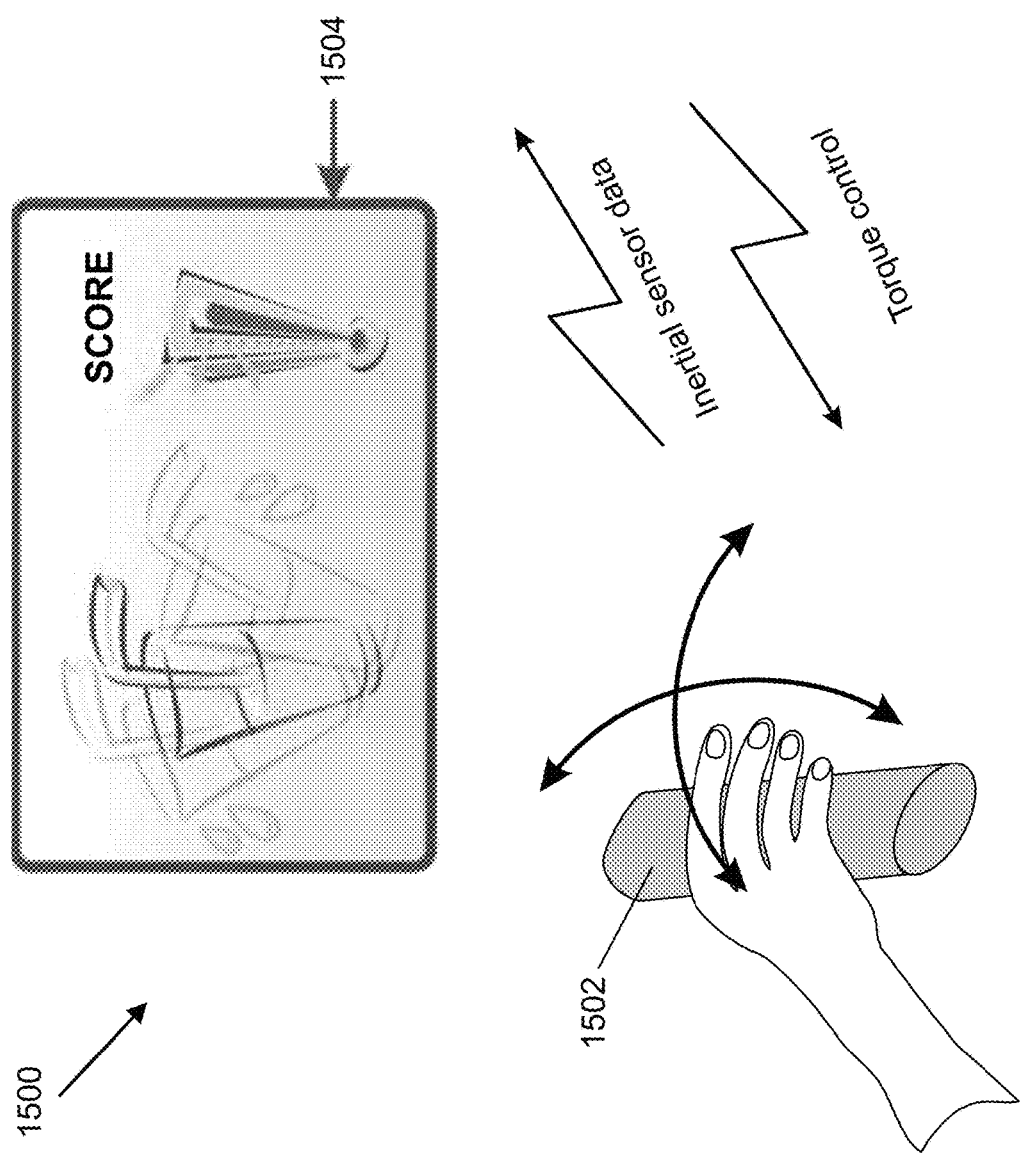
FIG. 15 is a schematic diagram of a prevent-the-water-from-spilling game played with a handheld gyroscopic apparatus, in accordance with an exemplary embodiment of the invention.

FIG. 15 is a schematic diagram of a prevent-the-water-from-spilling game 1500 played with a handheld gyroscopic apparatus 1502, in accordance with an exemplary embodiment of the invention. A base unit 1504 is provided which is similar to the base units 802, 1304 described in other embodiments. Optionally, base unit 1504 is the same component as base unit 802 and/or 1304, only the game being presented on it has changed. Optionally, game 1300 and game 1500 are both available from a menu on the base unit.

Figure 16:
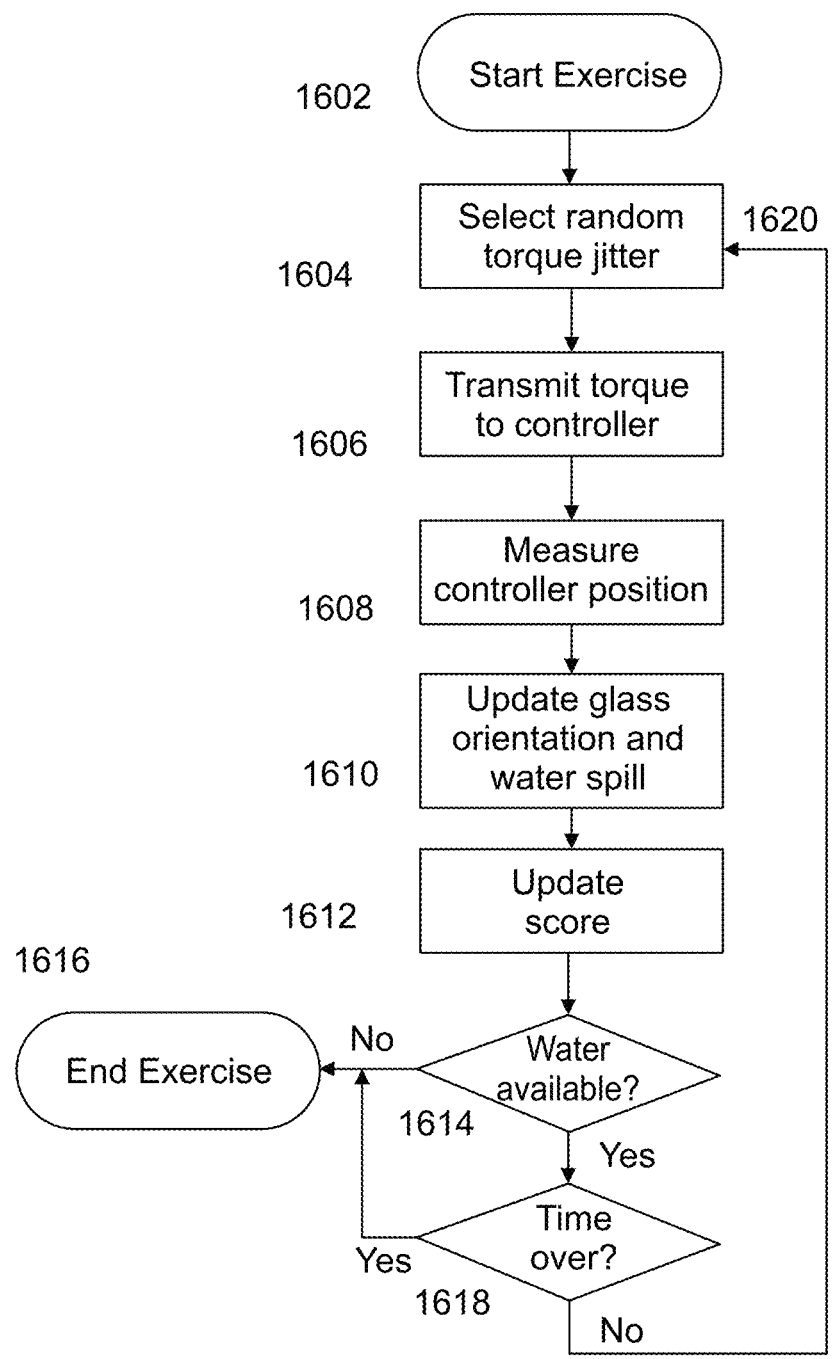
FIG. 16 is a flowchart showing a method of playing a prevent-the-water-from-spilling game with a handheld gyroscopic apparatus, in accordance with an exemplary embodiment of the invention; and, FIG. 17 is a schematic diagram showing a screen of a driving game and a handheld gyroscopic apparatus for playing the game, in accordance with an exemplary embodiment of the invention.

FIG. 16 is a flowchart showing a method 1600 of playing a prevent-the-water-from-spilling game 1500 with a handheld gyroscopic apparatus 1502, in accordance with an exemplary embodiment of the invention. Actions (1602) through (1608) are similar to those of the shooting game, in an embodiment of the invention, with the distinction being that the user is trying to maintain a particular orientation and/or controlled motion of apparatus 1502 to prevent "water" from spilling out of a "glass". So rather than moving apparatus 1502 to put a sight on a target, the user is trying to maintain orientation of the apparatus 1502 against a selected (1604) torque jitter. Optionally, the torque jitter is varied during the exercise and/or may be selected to train those places where the user is weak, or not to over-demand at those positions/angles. The user is scored (1612) based on a calculation of how much water has spilled from the glass based on the sensed (1608) movements of the apparatus 1502. In an en embodiment of the invention, it is determined (1614) if water is still available and if yes, it is optionally determined (1618) if there is still time left in the game. If no water is available and/or there is no time left, or if the amount of water available is determined (1614) to be below a predetermined threshold, the game is ended (1616). If there is still water available and there is still time left the user can continue (1620) playing the game. Optionally, with a different torque applied.

Figure 17:
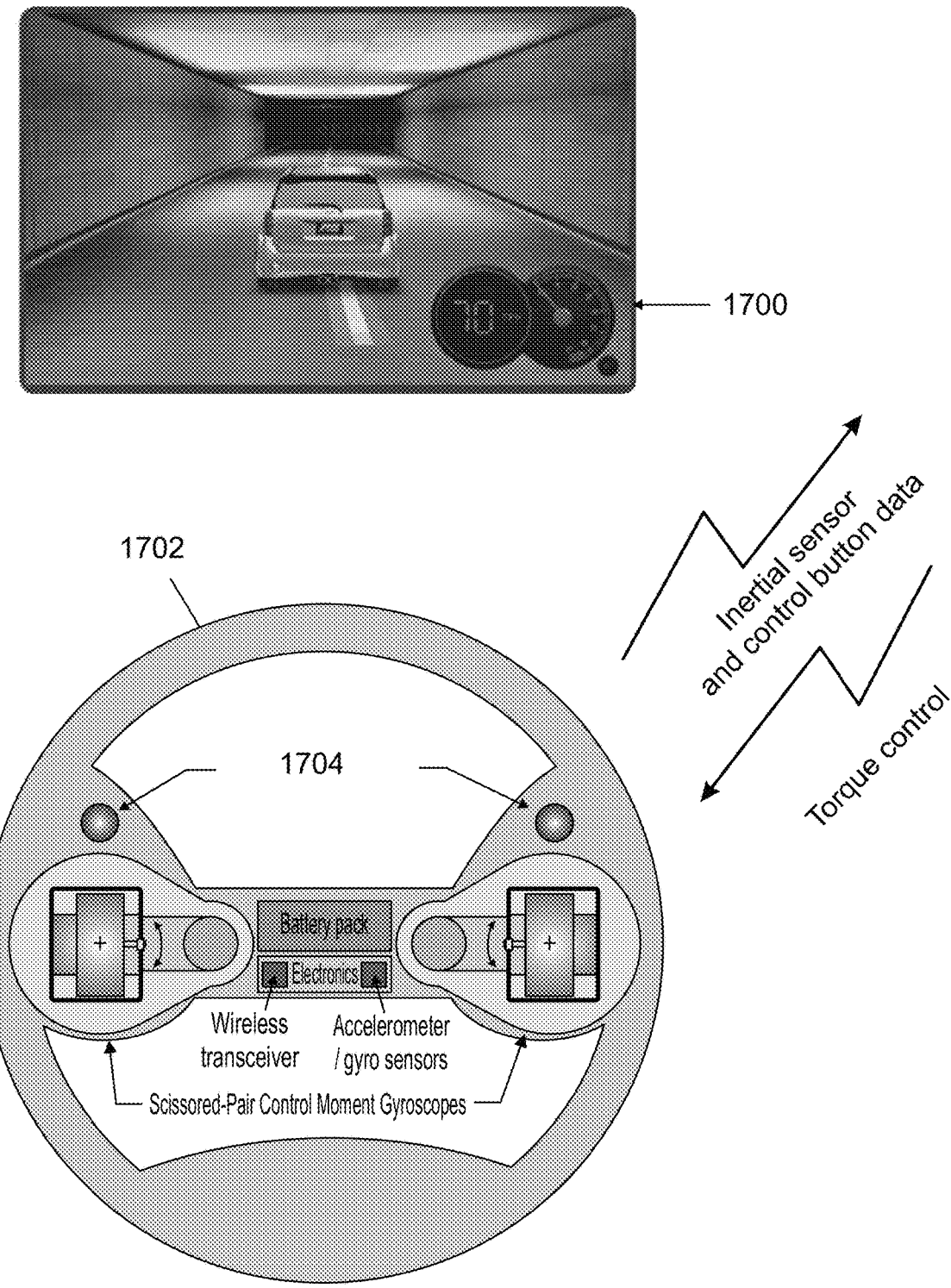

FIG. 17 schematic diagram showing a screen of a driving game 1700 and a handheld gyroscopic apparatus 1702 for playing the game 1700, in accordance with an exemplary embodiment of the invention. In an embodiment of the invention, the user directs a vehicle using CMG provisioned apparatus 1702. Apparatus 1702 is optionally, shaped like a steering wheel. In an embodiment of the invention, apparatus 300 is interchangeable with a plurality of housings, wherein each of the housing is shaped for a particular use. For example, apparatus 300 is optionally inserted into a steering wheel shaped housing for use with game 1700. In some embodiments of the invention, apparatus 1702 is provided with control buttons 1704 for performing action within the system and/or game and/or exercise.

It is expected that during the life of a patent maturing from this application many relevant handheld gyroscopic apparatuses may be developed and the scope of the term gyroscope is intended to include all such new technologies and/or functionally equivalent a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A gyroscopic exercise apparatus, comprising:
   at least one control-moment gyroscope;
   at least one internal motion sensor for sensing movement of the apparatus;
   at least one spindle motor for providing rotation to a rotor of the gyroscope; and,
   at least one reversible motor for providing rotation to at least one gimbal of the gyroscope.

2. An apparatus according to claim 1, further comprising a communications module for sending and receiving data.

3. An apparatus according to claim 1, further comprising an ergonomic housing.

4. An apparatus according to claim 1, comprising two gyroscopes.

5. An apparatus according to claim 4, wherein the two gyroscopes are configured in a scissored pair.

6. An apparatus according to claim 1, comprising three gyroscopes.

7. An apparatus according to claim 1, comprising four gyroscopes.

8. An apparatus according to claim 7, wherein the four gyroscopes are configured in two scissored pairs.

9. An apparatus according to claim 1, wherein sensed movement comprises at least one of force, nature, direction, orientation and/or acceleration of apparatus.

10. An apparatus according to claim 1, configured to control the at least one control-moment gyroscope based on the sensing by the at least one motion sensor.

11. An apparatus according to claim 1, configured to at least one of assist and resist the motion of a patient using the at least one control-moment gyroscope.

12. An apparatus according to claim 11, wherein the at least one of assisting and resisting the motion is in response to sensing by the at least one motion sensor.

13. An apparatus according to claim 11, configured to apply the at least one of assistance and resistance in a single joint axis.

14. An apparatus according to claim 1, configured to apply up to 3 axis torques to a body portion of a patient.

15. An apparatus according to claim 1, configured to be handheld.

16. An apparatus according to claim 1, configured to be removably attached to a body portion of a patient.

17. A system for exercise, comprising:
    at least one gyroscopic exercise apparatus including at least one control-moment gyroscope, including at least one reversible motor, and at least one internal motion sensor for sensing movement of the apparatus; and,
    a base unit in operative communication with the gyroscopic exercise apparatus.

18. A system according to claim 17, configured with a wireless communication connection between the gyroscopic exercise apparatus and the base unit.

19. A system according to claim 17, configured with a communication connection over a global communications network between the gyroscopic exercise apparatus and the base unit.

20. A system according to claim 17, further comprising at least one of a database and a memory having stored thereon a plan.

21. A system according to claim 20, configured to control the gyroscopic exercise apparatus according to the plan.

* * * * *